US012199901B2

(12) United States Patent
Harada et al.

(10) Patent No.: US 12,199,901 B2
(45) Date of Patent: Jan. 14, 2025

(54) TERMINAL CAPABLE OF HANDLING HIGH FREQUENCY BAND

(71) Applicant: NTT DOCOMO, INC., Tokyo (JP)

(72) Inventors: Hiroki Harada, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 17/595,364

(22) PCT Filed: Jan. 21, 2020

(86) PCT No.: PCT/JP2020/001890
§ 371 (c)(1),
(2) Date: Nov. 15, 2021

(87) PCT Pub. No.: WO2020/235133
PCT Pub. Date: Nov. 26, 2020

(65) Prior Publication Data

US 2022/0209910 A1 Jun. 30, 2022

(30) Foreign Application Priority Data

May 17, 2019 (JP) ................................ 2019-094131

(51) Int. Cl.
*H04L 5/00* (2006.01)
*H04W 72/044* (2023.01)

(52) U.S. Cl.
CPC ......... *H04L 5/0048* (2013.01); *H04W 72/044* (2013.01)

(58) Field of Classification Search
CPC .................................................... H04L 5/0048
See application file for complete search history.

(56) References Cited

U.S. PATENT DOCUMENTS

| | | | | |
|---|---|---|---|---|
| 11,558,790 | B2 * | 1/2023 | Cui | H04W 24/10 |
| 2019/0215790 | A1 * | 7/2019 | Kim | H04L 5/0048 |
| 2020/0053671 | A1 * | 2/2020 | Kim | H04L 5/0007 |
| 2020/0067755 | A1 * | 2/2020 | Pan | H04L 27/2656 |
| 2020/0229236 | A1 | 7/2020 | Ohara et al. | |
| 2020/0280957 | A1 * | 9/2020 | Gao | H04L 5/0094 |
| 2021/0022069 | A1 * | 1/2021 | Liu | H04W 48/10 |
| 2021/0083730 | A1 * | 3/2021 | Hwang | H04L 5/0092 |

(Continued)

FOREIGN PATENT DOCUMENTS

| | | | |
|---|---|---|---|
| WO | 2018230879 | A1 | 12/2018 |
| WO | 2019049352 | A1 | 3/2019 |

OTHER PUBLICATIONS

3GPP TR 38.807 V0. 1.0 "3rd Generation Partnership Project; Technical Specification Group Radio Access Network; Study on requirements for NR beyond 52.6 GHZ (Release 16)" Mar. 2019 (43 pages).

(Continued)

*Primary Examiner* — Guang W Li

(57) ABSTRACT

A terminal can use a high frequency band having a higher frequency than a certain frequency band including one or more frequency ranges. When using the high frequency band, the terminal extends a range of SSB than that when using the certain frequency band and receives the SSB of which the SSB has been extended.

6 Claims, 10 Drawing Sheets

10

20

100

200

(56) References Cited

U.S. PATENT DOCUMENTS

| | | | | |
|---|---|---|---|---|
| 2022/0209910 | A1* | 6/2022 | Harada | H04W 16/28 |
| 2023/0379115 | A1* | 11/2023 | Siomina | H04L 5/0048 |

OTHER PUBLICATIONS

ETSI TS 138 133 V15.5.0 "5G; NR; Requirements for support of radio resource management (3GPP TS 38.133 version 15.5.0 Release 15)" Jul. 2019 (895 pages).

International Search Report issued in International Application No. PCT/JP2020/001890, mailed Mar. 24, 2020 (5 pages).

Written Opinion issued in International Application No. PCT/JP2020/001890; Dated Mar. 24, 2020 (4 pages).

* cited by examiner

TERMINAL CAPABLE OF HANDLING HIGH FREQUENCY BAND

TECHNICAL FIELD

The present invention relates to a terminal capable of handling a high frequency band.

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). In the 3GPP, specifications for 5th generation mobile communication system (5G, also called as New Radio (NR) or Next Generation (NG)) are also being considered.

In Release 15 and Release 16 (NR) of the 3GPP, the operation up to 52.6 GHz is specified. In addition, in the specifications for after Release 16, operation in a band exceeding 52.6 GHz has been studied (see Non-Patent Document 1). The target frequency range in Study Item (SI) is 52.6 GHz to 114.25 GHz.

Moreover, in Release 15 of 3GPP, the configuration of SS/PBCH Block (SSB) in a serving cell is specified (see Non-Patent Document 2). For example, as a transmission cycle (periodicity) of the SSB, 5, 10, 20, 40, 80, and 160 milliseconds (ms) are defined (user terminal (User Equipment, UE, hereinafter, abbreviated as a terminal as appropriate) of initial access is assumed to have a transmission cycle of 20 ms). Furthermore, the network notifies the terminal of the actually transmitted display index of the SSB (SSB-PositionsInBurst) by using system information (SIB1) or signaling of a radio resource control layer (RRC).

PRIOR ART DOCUMENT

Non-Patent Document

Non-Patent Document 1: 3GPP TR 38.807 V0.1.0, 3rd Generation Partnership Project; Technical Specification Group Radio Access Network; Study on requirements for NR beyond 52.6 GHz (Release 16), 3GPP, March 2019

Non-Patent Document 2: 3GPP TS 38.133 V15.5.0, 3rd Generation Partnership Project; Technical Specification Group Radio Access Network; NR; Requirements for support of radio resource management (Release 15), 3GPP, March 2019

SUMMARY OF THE INVENTION

As described above, when the carrier frequency is very high, increase in the phase noise and propagation loss becomes a problem. It is also more sensitive to Peak-to-Average Power Ratio (PAPR) and nonlinearity of a power amplifier.

To solve such problems, when using a band that exceeds 52.6 GHz, one approach is to apply cyclic Prefix-Orthogonal Frequency Division Multiplexing (CP-OFDM)/Discrete Fourier Transform-Spread OFDM (DFT-S-OFDM) having a relatively larger Sub-Carrier Spacing (SCS).

On the other hand, the larger the SCS, the shorter the symbol/Cyclic Prefix (CP) period and the slot period (assuming that the configuration of 14 symbols/slot is maintained). Also, the time domain period of the SSB is similarly shortened.

Furthermore, when the band exceeding 52.6 GHz is used, in order to handle the wider bandwidth and higher propagation loss, it is necessary to generate a narrower beam by using a large-scale (massive) antenna having a large number of antenna elements. That is, a large number of beams are required to cover a certain geographical area.

The present invention has been made in view of the above discussion. One object of the present invention is to provide a terminal that can, even when using a high frequency band exceeding 50 GHz, form a reasonable coverage area by beamforming.

According to one aspect of the present disclosure, a terminal (UE 200) includes a control unit (control unit 270) that, when using a high frequency band (FR2) having a higher frequency than a certain frequency band including one or more frequency ranges (FR1, FR2), extends a range of an index (SSB index) of a synchronization signal block (SSB) more than that when using the certain frequency band; and a receiving unit (control signal processing unit 240) that receives the synchronization signal block in which the index has been extended more than that when using the certain frequency band.

According to another aspect of the present disclosure, a terminal (UE 200) includes a control unit (control unit 270) that, when using a high frequency band having a higher frequency than a certain frequency band including one or more frequency ranges, changes a gap between synchronization signal blocks that are adjacent in a time direction than that when using the certain frequency band; and a receiving unit (control signal processing unit 240) that receives the synchronization signal block in which the gap has been changed from that when using the certain frequency band.

According to another aspect of the present disclosure, a terminal (UE 200) includes a control unit (control unit 270) that, when using a high frequency band having a higher frequency than a certain frequency band including one or more frequency ranges, changes a mapping pattern of a slot including a synchronization signal block than that when using the certain frequency band; and a receiving unit (control signal processing unit 240) that receives the synchronization signal block in which the mapping pattern has been changed from that when using the certain frequency band.

MODES FOR CARRYING OUT THE INVENTION

(1) Overall Schematic Configuration of Radio Communication System

Figure 1:
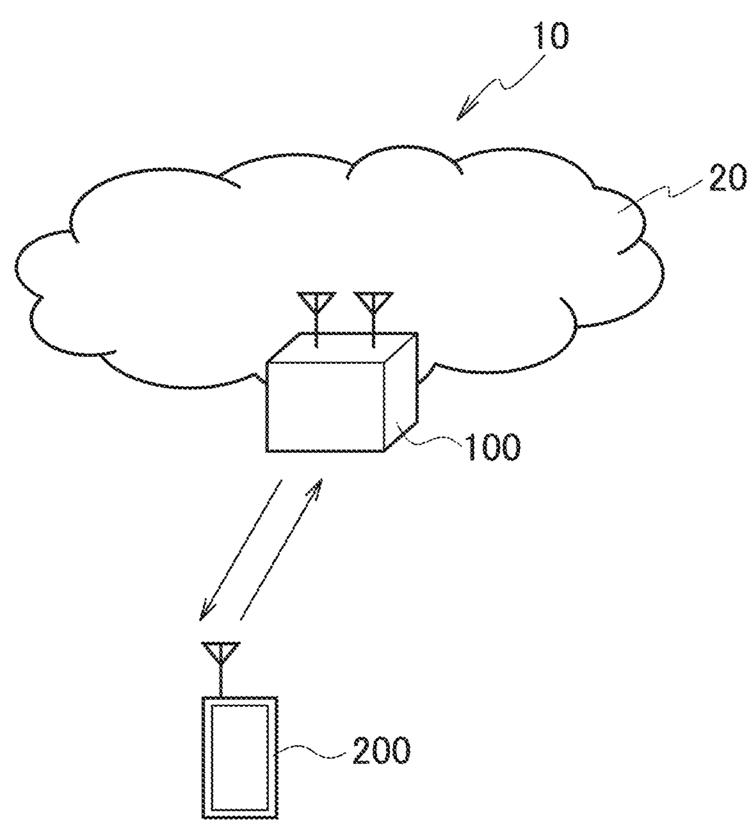
FIG. 1 is an overall schematic configuration diagram of a radio communication system 10.

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and UE 200 can handle, by controlling radio signals transmitted from a plurality of antenna elements, a massive MIMO that generate a more directional beam, a carrier aggregation (CA) that uses multiple component carriers (CC), and a dual connectivity (DC) and the like that transmits component carrier simultaneously between several NG-RAN Node and UE.

Figure 2:
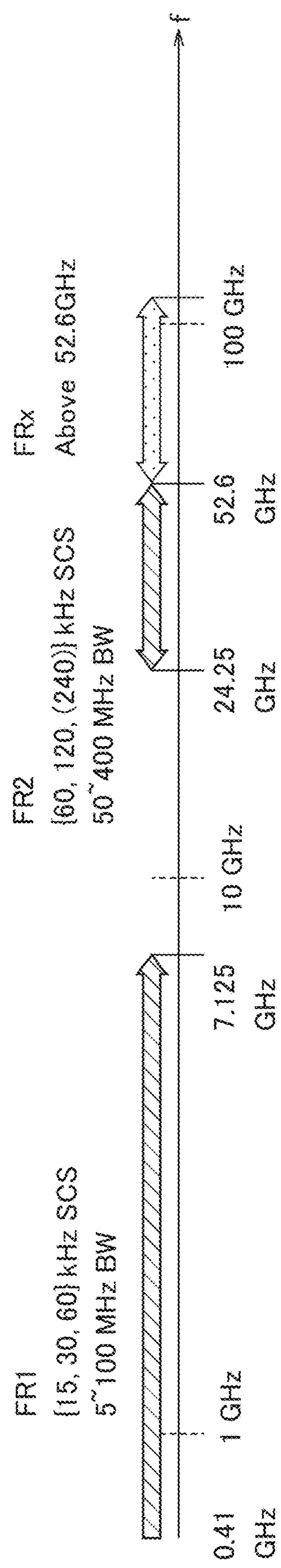
FIG. 2 is a diagram showing a frequency range used in the radio communication system 10.

The radio communication system 10 corresponds to a plurality of frequency ranges (FR). FIG. 2 shows the frequency range used in the radio communication system 10.

As shown in FIG. 2, the radio communication system 10 corresponds to FR1 and FR2. The frequency band of each FR is as below.

FR1: 410 MHz to 7.125 GHz

FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP TS38.300 and corresponds to one subcarrier spacing in the frequency domain.

Furthermore, the radio communication system 10 corresponds to FRx (high frequency band) which includes FR1 and FR2 and is a higher frequency than the frequency band of 52.6 GHz or less. FRx belongs to so-called EHF (extremely high frequency, also called millimeter wave). Specifically, FRx is a frequency band exceeding 52.6 GHz and up to 114.25 GHz.

Particularly, as described above, in a high frequency band, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (that is, fewer FFT points), a PAPR reduction mechanism, or a single carrier waveform may be required.

In order to solve such a problem, as explained above, when using a band exceeding 52.6 GHz, one approach can be to apply CP-OFDM/DFT-S-OFDM with a larger Sub-Carrier Spacing (SCS). However, the larger the SCS, the shorter the symbol/Cyclic Prefix (CP) period and the slot period (when the 14 symbol/slot configuration is maintained).

Figure 3:
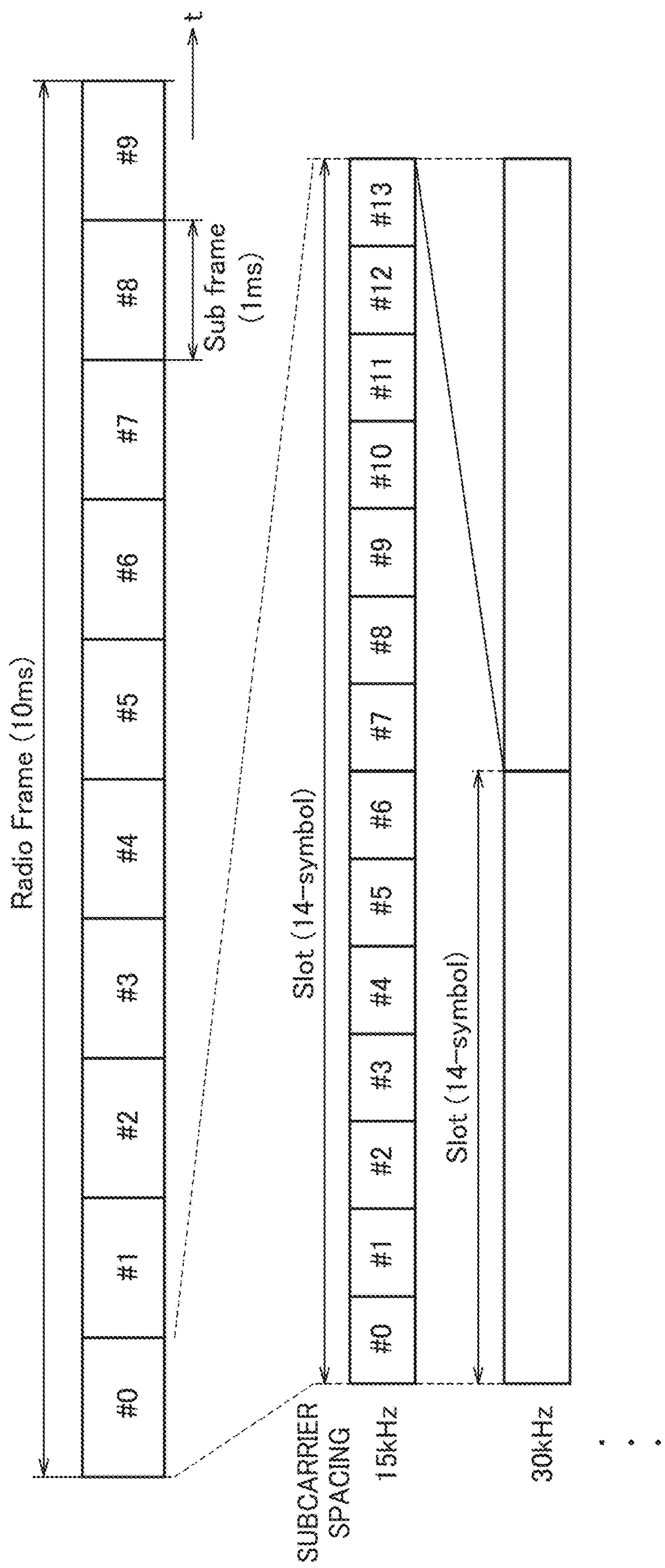
FIG. 3 is a diagram illustrating a configuration example of a radio frame, a subframes, and slots used in the radio communication system 10.

FIG. 3 shows a configuration example of a radio frame, subframes, and slots used in the radio communication system 10. Table 1 shows a relationship between SCS and a symbol period.

TABLE 1

| | SCS | | | | | | |
|---|---|---|---|---|---|---|---|
| | 15 kHz | 30 kHz | 60 kHz | 120 kHz | 240 kHz | 480 kHz | 960 kHz |
| Symbol Period (Unit: μs) | 66.6 | 33.3 | 16.65 | 8.325 | 4.1625 | 2.08125 | 1.040625 |

As shown in Table 1, when the 14 symbol/slot configuration is maintained, the symbol period (and slot period) becomes shorter as the SCS becomes larger (wider). Also, the time domain period of SS/PBCH Block (SSB) is similarly shortened.

Figure 4:
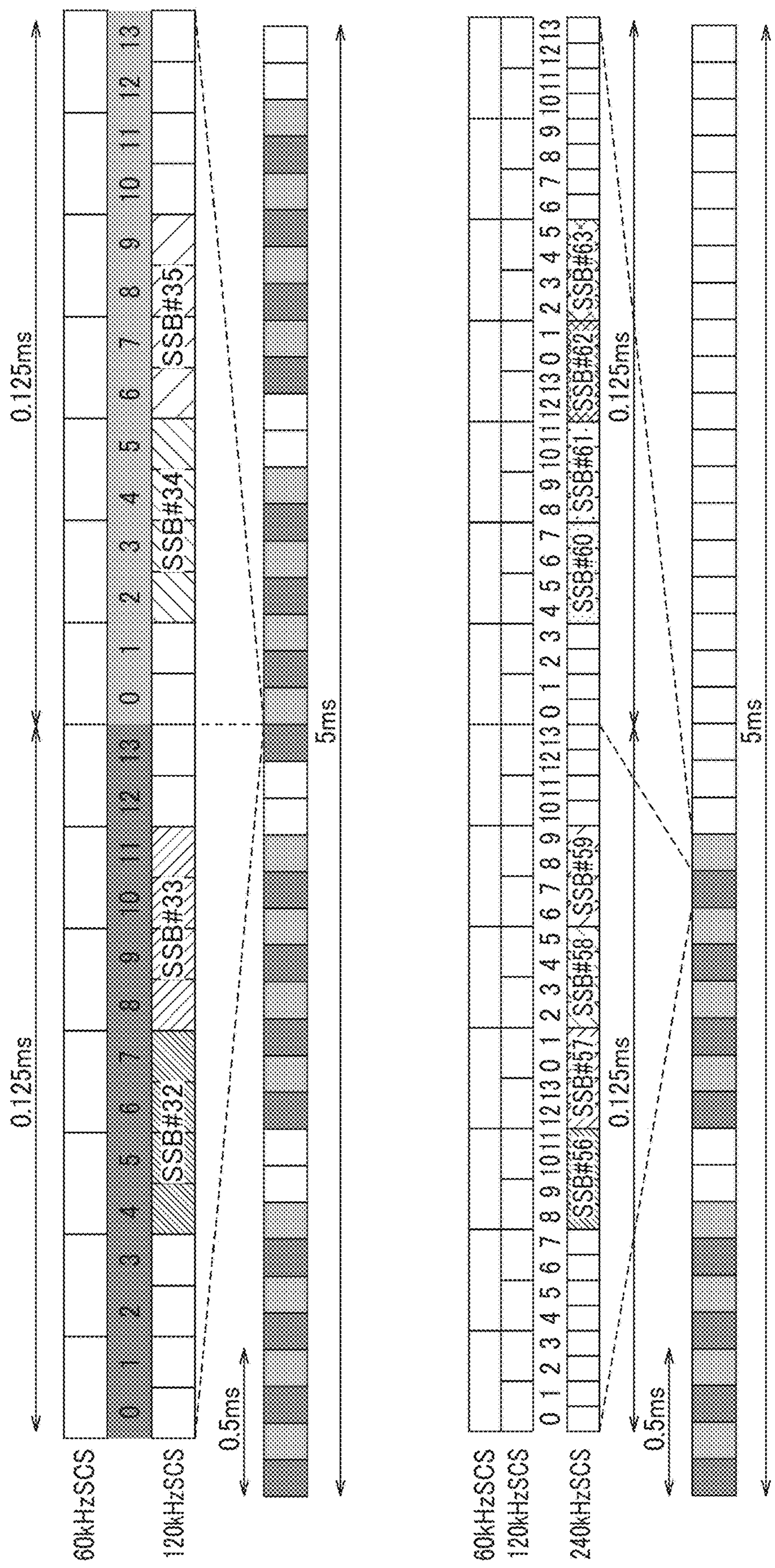
FIG. 4 is a diagram showing an example of a structure of SSB burst when FR2 according to 3GPP Release 15 is used.

FIG. 4 shows an example of a structure of SSB burst when FR2 according to 3GPP Release 15 is used.

The SSB is a block of a synchronization signal/broadcast channel constituted by Synchronization Signal (SS) and PBCH (Physical Broadcast CHannel). The SSB is mainly transmitted periodically so that the UE 200 can execute detection of the cell ID and the reception timing at the start of communication. In 5G, the SSB is also used for measuring the reception quality of each cell.

In the case of Release 15, the following contents are specified for the setting of the SSB of the serving cell. Specifically, 5, 10, 20, 40, 80, and 160 milliseconds (ms) are defined as the transmission cycle (periodicity) of the SSB. Note that, the UE 200 of the initial access is assumed to have a transmission cycle of 20 ms.

The network (NG-RAN 20) notifies the UE 200 of a display index of the actually transmitted SSB (SSB-PositionsInBurst) by using system information (SIB1) or signaling of a radio resource control layer (RRC).

Specifically, in the case of FR1, the display index is notified by 8-bit bitmap of the RRC and the SIB1. In the case of FR2, such notification is made by 64-bit bitmap of the RRC, 8-bit bitmap of the SSB in a group, and 8-bit group bitmap of the SIB1.

Also, as explained above, when handling FRx (high frequency band), in order to cope with the wide bandwidth and large propagation loss, it is necessary to generate a narrower beam by using a large-scale (massive) antenna having a large number of antenna elements. That is, a large number of beams are required to cover a certain geographical area.

In the case of Release 15 (FR2), the maximum number of beams used for SSB transmission is 64; however, to cover a certain geographic area with the narrow beam, the maximum number of beams needs to be extended (for example, 256).

Hereinafter, while referring to the functional block configuration and operation of the UE 200, a description will be given of a method capable of forming a reasonable coverage area by beamforming even when using a high frequency band like the FRx.

(2) Functional Block Configuration of Radio Communication System

Next, a functional block configuration of the radio communication system 10 will be described. Specifically, the functional block configuration of the UE 200 will be described.

Figure 5:
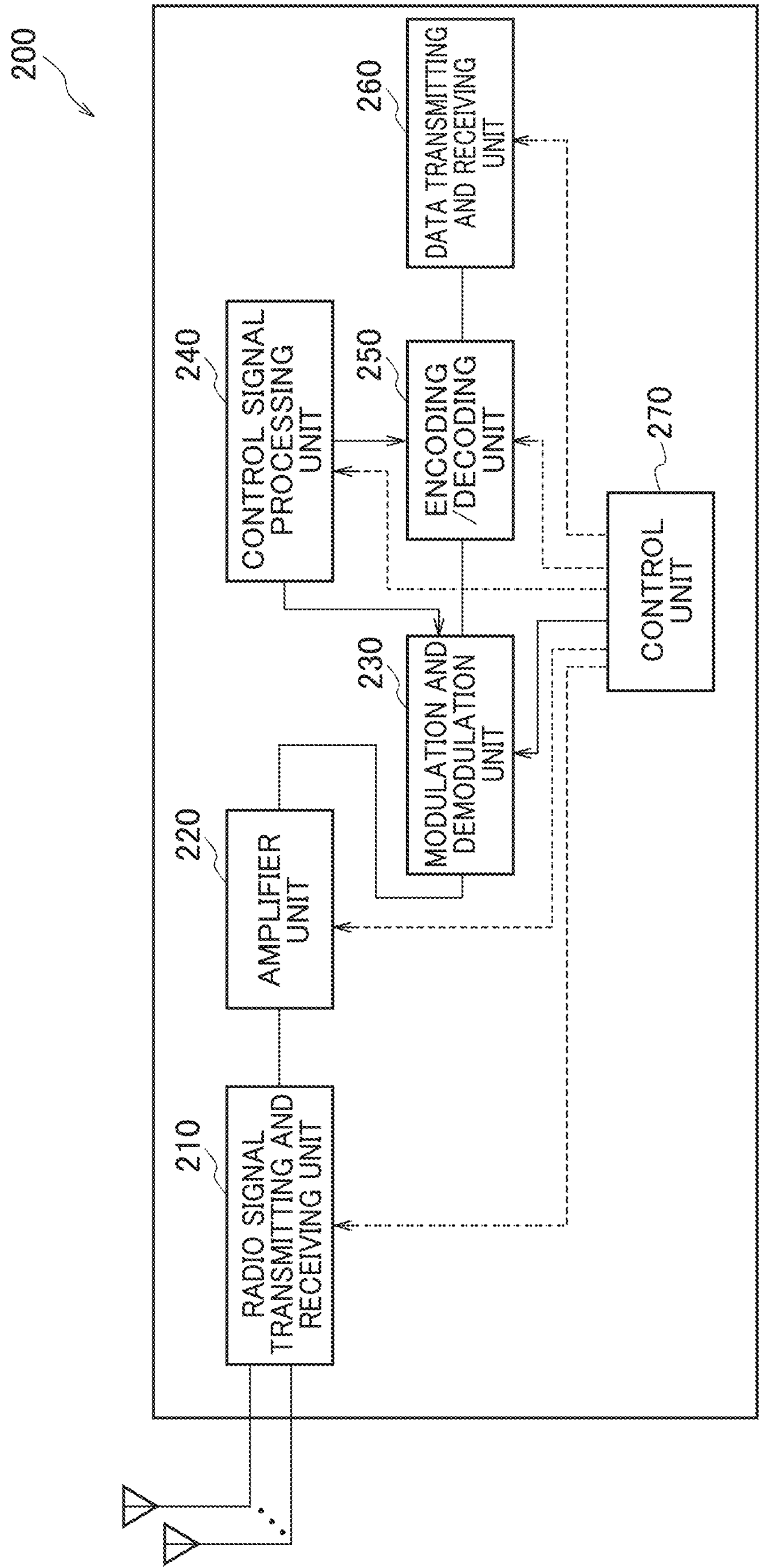
FIG. 5 is a functional block diagram of UE 200.

FIG. 5 is a functional block diagram of the UE 200. As shown in FIG. 5, the UE 200 includes a radio signal transmitting and receiving unit 210, an amplifier unit 220, a modulation and demodulation unit 230, a control signal processing unit 240, an encoding/decoding unit 250, a data transmitting and receiving unit 260, and a control unit 270.

The radio signal transmitting and receiving unit 210 transmits/receives a radio signal according to NR. The radio signal transmitting and receiving unit 210, by controlling radio (RF) signals transmitted from a plurality of antenna elements, handles massive MIMO that produces a more directional beam, carrier aggregation (CA) that uses multiple component carriers (CC), and the dual connectivity (DC) in which component carriers are simultaneously transmitted between multiple NG-RAN Nodes.

The amplifier unit 220 includes a Power Amplifier (PA)/Low Noise Amplifier (LNA) or the like. The amplifier unit 220 amplifies the signal output from the modulation and demodulation unit 230 to a predetermined power level. The amplifier unit 220 amplifies the RF signal output from the radio signal transmitting and receiving unit 210.

The modulation and demodulation unit 230 executes data modulation/demodulation, transmission power setting, resource block allocation, and the like for each predetermined communication destination (gNB 100 or other gNB).

The control signal processing unit 240 performs processing related to various control signals transmitted and received by the UE 200. Specifically, the control signal processing unit 240 receives various control signals transmitted from the gNB 100 via a predetermined control channel, for example, radio resource control layer (RRC) control signals. In addition, the control signal processing unit 240 transmits various control signals to the gNB 100 via a predetermined control channel.

Further, in the present embodiment, the control signal processing unit 240 receives the SSB which is a block of the synchronization signal/broadcast channel. Particularly, when using the FRx, the control signal processing unit 240 can receive SSB with an expanded index of the SSB compared to when using the FR1 or the FR2.

Specifically, while the control signal processing unit 240 uses SSB index of 0 to 63 when using the FR1 or the FR2, it can receive SSB index that can have the SSB index extended from 0 to 255 when using the FRx.

In the present embodiment, when using the FRx, the control signal processing unit 240 constitutes a receiving unit that receives a synchronization signal block in which the index of the synchronization signal block is extended as compared with that when using a frequency band including the FR1 or the FR2.

Furthermore, in this manner, when the SSB index has been extended, the control signal processing unit 240 can receive from the network (NG-RAN20) the display of the SSB index (for example, SSB-PositionsInBurst) that has been changed from that when using the frequency band including the FR1 or the FR2.

In addition, when using the FRx, the control signal processing unit 240 may receive the SSB in which the gap between the adjacent SSBs in the time direction has been changed from that when using the FR1 or the FR2.

Specifically, when using the FRx, the control signal processing unit 240 can receive a changed SSB in which, in the structure of SSB burst as shown in FIG. 4, a gap equivalent to one or more slots is provided between adjacent SSBs (for example, SSB #56 and SSB #57), that is, the SSB of which a gap between the adjacent SSBs has been changed.

In the present embodiment, the control signal processing unit 240 constitutes the receiving unit that receives the synchronization signal block in which the gap between the synchronization signal blocks adjacent in the time direction has been changed from that when using the frequency band including the FR1 or the FR2. Note that "adjacent in the time direction" does not necessarily mean that the two SSBs are continuous in the time direction, but may mean SSB located immediately before or immediately after in the time direction.

Furthermore, when using the FRx, the control signal processing unit 240 can receive a changed SSB of which the mapping pattern of the slot including the SSB in a radio frame or a half-frame (half-frame) has been changed from that when using the FR1 or the FR2.

Specifically, when using the FRx, the control signal processing unit 240 uses a 5-ms half-frame in the structure of the SSB burst shown in FIG. 4, that is, the changed SSB in which the mapping pattern in the slot including the candidate position of the SSB has been changed from that when using the FR1 or the FR2.

In the present embodiment, when using the FRx, the control signal processing unit 240 constitutes a receiving unit that receives a synchronization signal block whose mapping pattern has been changed from that when using the frequency band including the FR1 or the FR2.

The encoding/decoding unit 250 executes data division/concatenation and channel coding/decoding for each predetermined communication destination (gNB 100 or other gNB).

Specifically, the encoding/decoding unit 250 divides the data output from the data transmitting and receiving unit 260 into pieces of a predetermined size, and performs channel coding on the pieces of the data. The encoding/decoding unit 250 decodes the data output from the modulation and demodulation unit 230 and connects the decoded data.

The data transmitting and receiving unit 260 transmits and receives Protocol Data Unit (PDU) and Service Data Unit (SDU). Specifically, the data transmitting and receiving unit 260 executes PDU/SDU assembly/disassembly and the like in multiple layers (such as medium access control layer (MAC), radio link control layer (RLC), and packet data convergence protocol layer (PDCP)). The data transmitting and receiving unit 260 performs data error correction and retransmission control based on hybrid ARQ (Hybrid automatic repeat request).

The control unit 270 controls each functional block constituting the UE 200. Hereinafter, an outline of the functions of the control unit 270 will be described. Details of the operations of the UE 200 executed by the control unit 270 will be described later.

In the present embodiment, the control unit 270 can extend the range of the index (SSB index) of the synchronization signal block (SSB) when using one or more frequency ranges, specifically, the FRx (high frequency band)

that has a higher frequency than the frequency band including the FR1 or the FR2, as compared to that when using the FR1 or the FR2.

Specifically, while the control unit 270 uses the SSB index from 0 to 63 when using the FR1 or the FR2, it can use, for example, an extended SSB index that is extended from 0 to 255 when using the FRx. Note that the value 255 is an example, and may be less than 255, or may be more than 255, as long as it is extended as compared to that when using the FR1 or the FR2.

Furthermore, when using the FRx, the control unit 270 can change the gap between adjacent SSBs in the time direction from the same when using the FR1 or the FR2.

Specifically, the control unit 270 can receive SSB in which at least one symbol gap is provided between the adjacent SSBs in the time direction. Note that a symbol is, specifically, OFDM symbol that constitutes the slot shown in FIG. 3.

Also, when using the FRx, the control unit 270 can change the mapping pattern of the slot including the SSB in the radio frame or the half-frame from the one used in when using the FR1 or the FR2.

Specifically, when using the FRx, the control unit 270 can change to a mapping pattern in which slots including the SSB are separated by at least one slot gap, or a mapping pattern in which the slots including the SSB are consecutive in multiple slots. Note that a modification example of a specific mapping pattern will be further described later.

(3) Operation of Radio Communication System

Next, the operation of the radio communication system 10 will be described. In present embodiment, as explained above, the radio communication system 10 uses FRx (see FIG. 2) which is a frequency band exceeding 52.6 GHz and up to 114.25 GHz.

The UE 200 performs an operation capable of forming a reasonable coverage area by beamforming even when using the high frequency band like the FRx.

(3.1) Operation Overview

In the present embodiment, when using the FRx, the UE 200 applies at least one of the following operations. This allows the UE 200 to cover a certain geographical area while generating a narrower beam by using a large-scale (massive) antenna with a large number of antenna elements.

- Option 1: Extend the index of the SSB (SSB index) to >63 (i.e., >64 SSB)
- Option 2: Use the SSB mapping pattern in the slot, which is different from the case of using the FR1 or the FR2 (3GPP Release 15, the same applies hereinafter)
- Option 3: Use a mapping pattern in a half-frame, which is different from the case of using the FR1 or the FR2
- Option 4: If the SSB index has been extended, receive the display of the actually transmitted SSB index from the network (3.2) Operation Example Next, specific operation examples of each of the options described above will be described. The numerical range, SSB candidate position, presence/absence or size of the gap, and the like in the following operation examples are mere examples, and may be appropriately changed according to the capability of the UE 200, operation environment, and the like.

(3.2.1) Option 1

In this option, when using the FRx, the range of the SSB index is extended to a value exceeding 63. As described above, by expanding the range of the SSB index, the coverage area can be expanded while using the narrow beam even when using the FRx.

Figure 6:
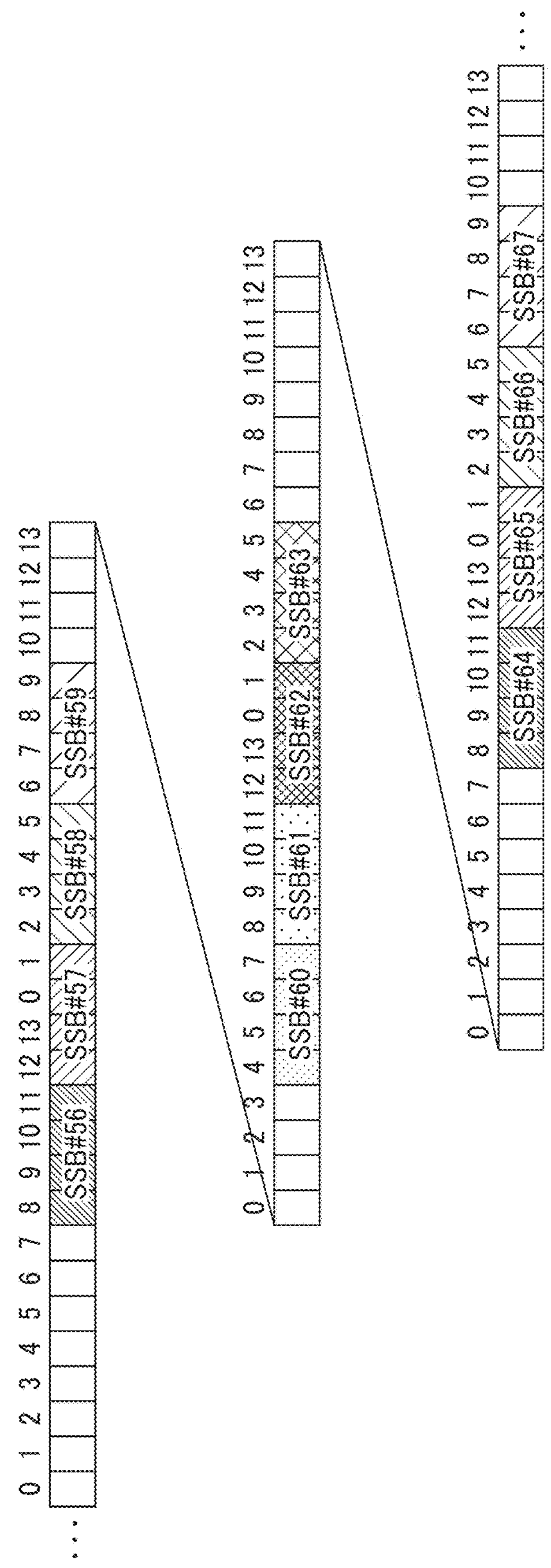
FIG. 6 is a diagram showing an example of a partial arrangement of SSB according to Option 1.

FIG. 6 shows a partial arrangement example of the SSB according to Option 1. As shown in FIG. 6, in the case of this option, the SSB index has a value of #64 or later. The range of the SSB index is not particularly limited and, for example, 0 to 255 can be suitably used.

Note that, if the range of the SSB index, that is, the maximum number of SSB to be transmitted is extended, it is necessary to consider how to map the large number of SSBs on the radio frame, the number of beams that the UE 200 can monitor, a method (signaling overhead) indicating the SSB index actually transmitted from the network, and the like. In this case, the following Options 2 to 4 can be applied.

(3.2.2) Option 2

In this option, when using the FRx, the mapping pattern of the SSB in the slot is different from when using the FR1 or the FR2.

Figure 7:
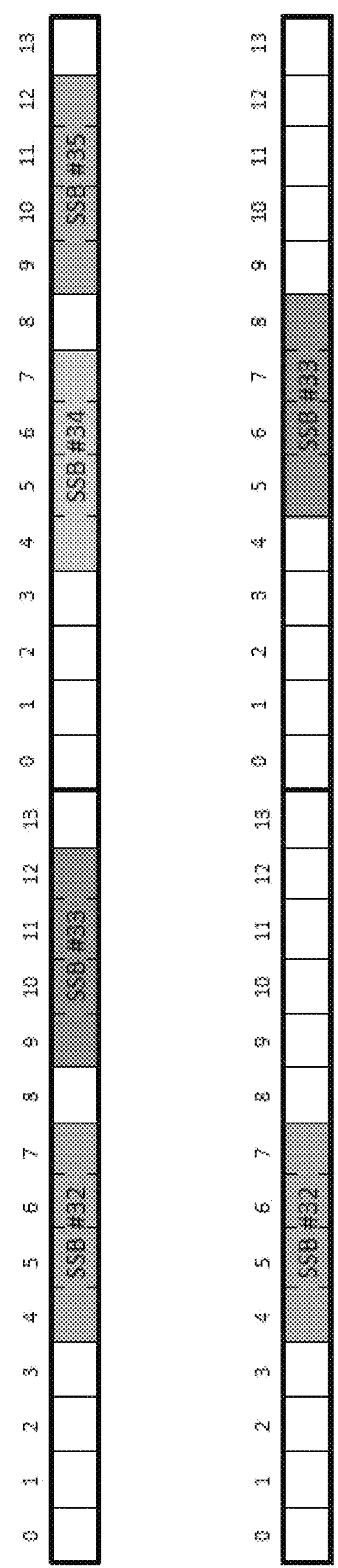
FIG. 7 is a diagram showing an example of SSB mapping pattern according to Option 2.

FIG. 7 shows an example of the SSB mapping pattern in Option 2. As shown in FIG. 7, in a slot (from 0 to 13 in the figure), at least one symbol gap is provided between the SSBs that are adjacent in the time direction.

Specifically, in the upper part of FIG. 7, one symbol gap is provided between the SSBs that are adjacent in the time direction (for example, between SSB #32 and SSB #33). However, the present invention is not limited to this example. For example, 2 or 3 SSBs may be mapped while having at least one symbol gap.

According to this mapping pattern, a fixed symbol gap is provided between the adjacent SSBs so that a beam switching delay can be covered.

In the lower part of FIG. 7, only one SSB is mapped in the slot. Accordingly, a plurality of symbol gaps are provided between the adjacent SSBs (between SSB #32 and SSB #33).

According to this mapping pattern, multiplexing between the SSB and data in a slot can be facilitated without changing the transmission beam in the slot. Also, in this case, the SSB may be placed at the beginning of the slot or at the end of the slot.

Alternatively, as shown in FIG. 7, the SSB may be placed in the middle of the slot to avoid collision with CORESET (control resource sets) and a reference signal (RS). From this viewpoint, it is preferable to keep the first SSB (SSB #32) in the slot the same as that used when using the FR1 or the FR2, but change the position of the second SSB (SSB #33) to secure the symbol gap.

(3.2.3) Option 3

In this option, the mapping pattern of SSB in the half-frame of 5 ms, that is, the slot containing the candidate position of the SSB, is changed from that when using the FR1 or the FR2.

Figure 8:
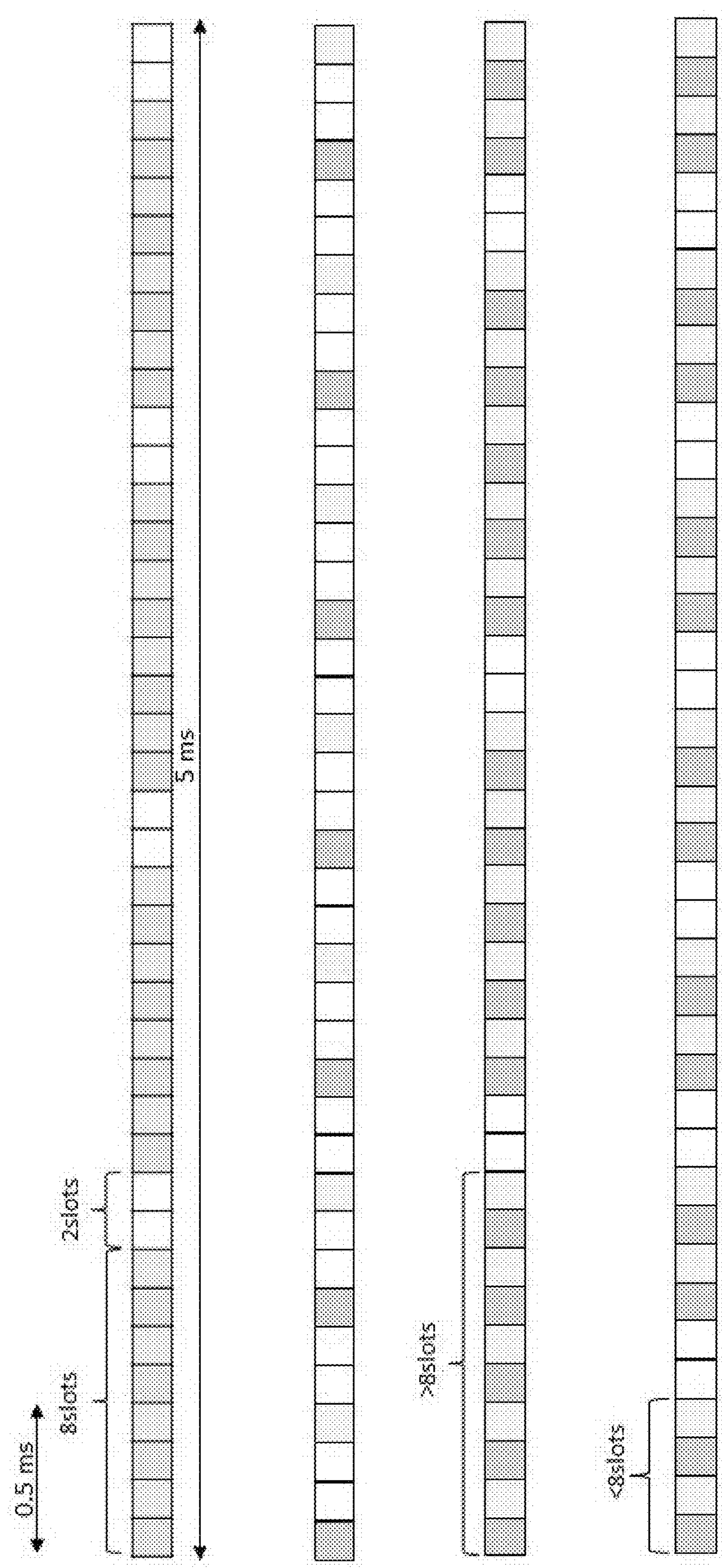
FIG. 8 is a diagram showing an example of a mapping pattern of slots including SSB according to Option 3.

FIG. 8 shows an example of a mapping pattern of the slots including the SSB in Option 3. Specifically, the top row of FIG. 8 is a reproduction of the 5 ms half-frame configuration shown in FIG. 4. The shaded rectangles (slots) include the SSB candidate positions (hereinafter, "SSB").

As shown in the second row of FIG. 8, the slots including the SSB may be separated by at least one slot gap. The slot gaps are indicated by unshaded rectangles. By this, the uplink (UL) can be assigned to the slot gap.

Further, as shown in the third or fourth row of FIG. 8, the slots including the SSB may be consecutive within at least a plurality of n slots.

Specifically, as shown in the third row, as long as a plurality of n are continuous, n may be larger than 8 or smaller than 8, which is used in the FR1 or the FR2. This contributes to minimization of the measurement window using the SSB because the SSBs are concentrated in the time direction.

Note that the above two operations may be combined. That is, at least one slot gap may be provided between the slots including the continuous SSB while forming the slots including the continuous SSB.

Also, when using the FRx, the arrangement of slots including such SSB may be used permanently, or may be dynamically changed by notifying information indicating the arrangement from the network.

Further, in the above description, the target is the half-frame of 5 ms; however, the target can be the wireless frame (10 ms).

(3.2.4) Option 4

In this option, the display of the SSB index actually transmitted from the network is changed from that when using the FR1 or the FR2.

Specifically, the display of the SSB index is notified to the UE 200 by signaling of the RRC layer or the broadcast information (SIB1). This option can be suitably applied when the range of the SSB index is extended to a value exceeding 63 by Option 1.

Figure 9:
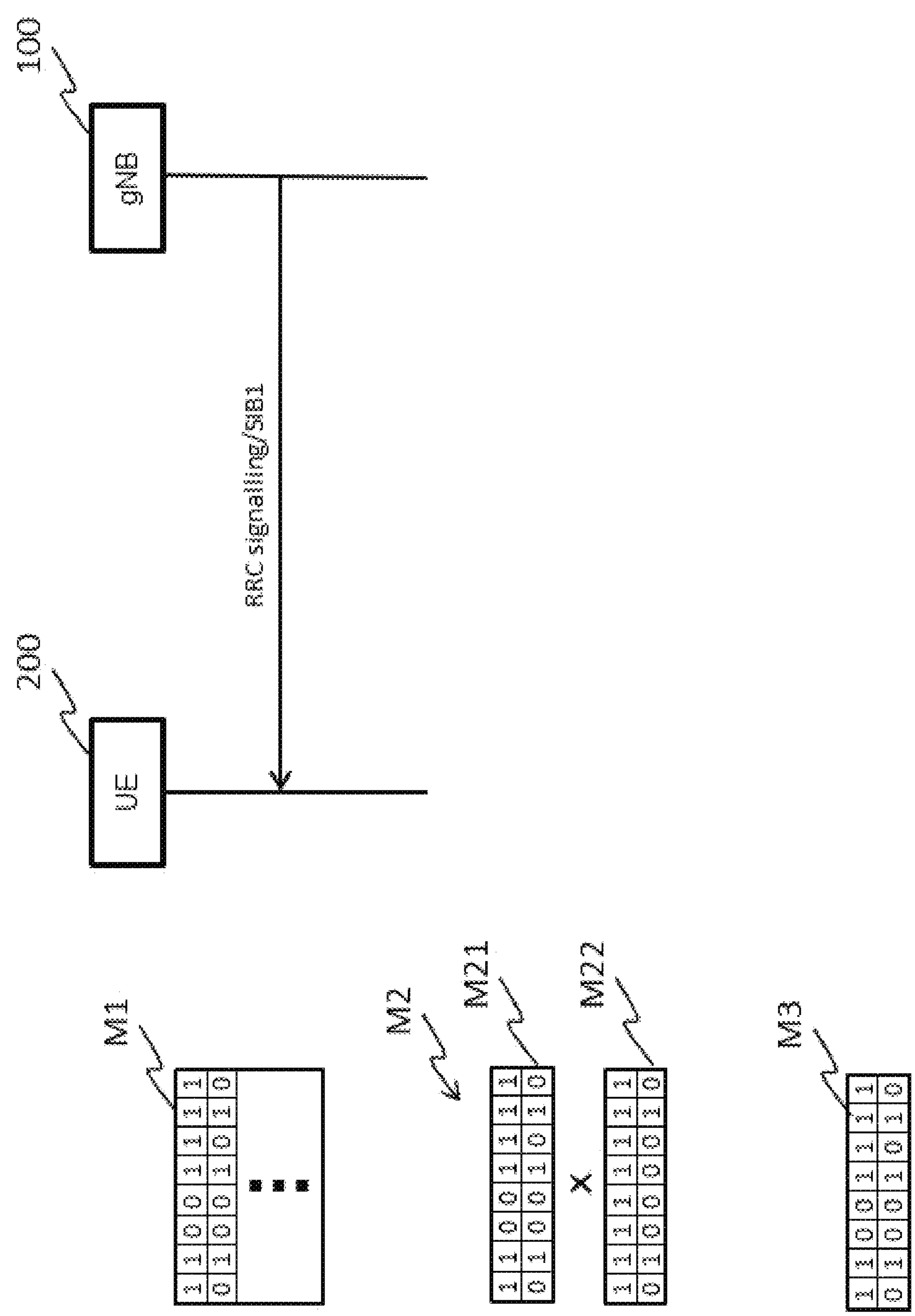
FIG. 9 is a diagram showing an example of a notification example of a display of SSB index according to Option 4.

FIG. 9 shows an example of notification of the display of the SSB index in Option 4. As shown in FIG. 9, the SSB index is transmitted from the gNB 100 to the UE 200 by the signaling of the RRC layer or the SIB1. The notification may be performed by signaling in a layer (MAC or the like) lower than the RRC layer, or by using system information (broadcast information) other than SIB1.

Also, as shown in FIG. 9, this option can use a plurality of display methods of the SSB index. Specifically, like the map M1, a bit map (for example, 256 bits) according to the number of the SSB indexes can be used. According to the map M1, all transmission patterns of the SSB can be completely and flexibly supported.

Alternatively, like a map M2, a combination of a group bitmap M21 and a bitmap M22 within the group may be used. The map M2 is similar to SSB-PositionsInBurst of the SIB1. In the map M2, the SSB index is displayed by a combination of ON/OFF of the bits in the group bitmap M21 and ON/OFF of the bitmap M22. The number of bits of the group bitmap M21 and the number of bits of the bitmap M22 are set according to the range of the SSB index.

Alternatively, like a map M3, only the group bitmap may be used. According to the map M3, although the flexibility of the SSB transmission pattern is restricted, the signaling overhead can be reduced.

The map M3 is preferably used for the SIB1 in which there is a restriction on the amount of information, while the map M1 can be suitably used for signaling of the RRC layer in which there is no severe restriction on the amount of information.

(4) Advantageous Effects

According to the above-mentioned embodiments, the following advantageous effects are obtained. Specifically, when using the FRx the UE 200 may extend the SSB index more than that when using the FR1 or the FR2. Therefore, the number of beams can be increased by using the large number of the SSBs that has been extended. By this, the UE 200 can realize formation of a reasonable coverage area by beamforming even when using a high frequency band like the FRx.

That is, the UE 200 can provide high-speed and high-quality communication even when using a high frequency band exceeding 50 GHz.

In the present embodiment, when using the FRx, the UE 200 can change the gap between the SSBs that are adjacent in the time direction as compared to that when using the FR1 or the FR2. In addition, when using the FRx, the UE 200 can change the mapping pattern of the slot including the SSB in the half-frame of 5 ms from that when using the FR1 or the FR2.

Therefore, the UE 200 can realize appropriate beam forming without causing a beam switching delay. By this, the UE 200 can provide high-speed and high-quality communication even when using a high frequency band exceeding 50 GHz.

Further, in the present embodiment, the UE 200 can receive the display of the SSB index that has been changed from that when using the FR1 or the FR2. Therefore, when using the FRx, the UE 200 can reliably recognize the SSB candidate position actually transmitted from the network. By this, the UE 200 can provide high-speed and high-quality communication even when using a high frequency band exceeding 50 GHz.

(5) Other Embodiments

Although the contents of the present invention have been described by way of the embodiments, it is obvious to those skilled in the art that the present invention is not limited to what is written here and that various modifications and improvements thereof are possible.

For example, in the above-described embodiment, the number of symbols (OFDM symbol) forming the slot is assumed to be 14 symbols; however, when using a high frequency band like the FRx, in order to support a large SCS, the number of symbols forming one slot may be more than 14 symbols. For example, 28 symbols/slot or 56 symbols/slot may be used.

In the above-described embodiments, the contents of Options 1 to 4 are sequentially described; however, as explained above, the UE 200 may execute one of Options 1 to 4, a combination thereof, or can simultaneously execute all the options.

In the above-described embodiments, FRx is premised on a frequency exceeding 52.6 GHz; however, FRx may be 52.6 GHz or less. In this case, the upper limit of FR2 may be lower than 52.6 GHz.

Moreover, the block diagram used for explaining the embodiments (FIG. 5) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 10:
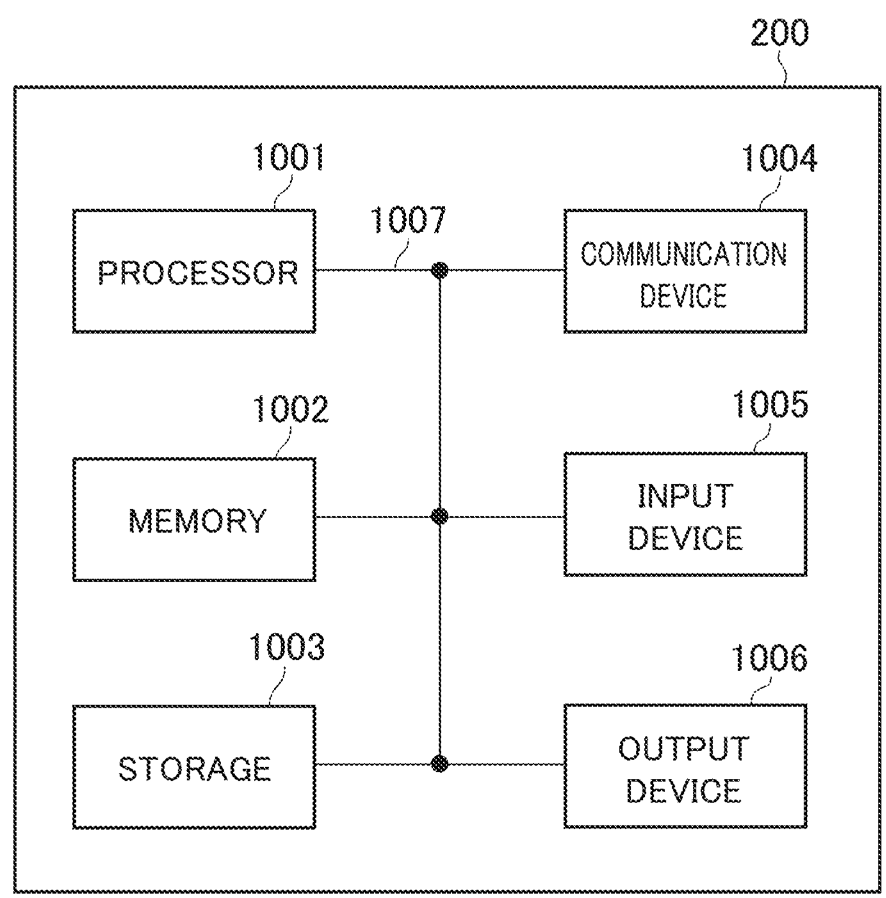
FIG. 10 is a diagram illustrating an example of a hardware configuration of the UE 200.

Furthermore, the UE 200 explained above can function as a computer that performs the processing of the radio communication method of the present disclosure. FIG. 10 is a diagram showing an example of a hardware configuration of the UE 200. As shown in FIG. 10, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 5) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be composed of one or more frames in the time domain. Each frame or frames in the time domain may be referred to as a subframe.

A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the numerology. The number of subcarriers included in the RB may be determined based on the numerology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain numerology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

In the present disclosure, the term "A and B are different" may mean "A and B are different from each other". It should be noted that the term may mean "A and B are each different from C".
Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmitting and receiving unit
220 Amplifier unit
230 Modulation and demodulation unit
240 Control signal processing unit
250 Encoding/decoding unit
260 Data transmitting and receiving unit
270 Control unit
1001 Processor
1002 Memory
1003 Storage
1004 Communication device
1005 Input device
1006 Output device
1007 Bus

The invention claimed is:

1. A terminal comprising:

a processor that assumes a candidate position of a first synchronization signal block in a slot when using a first frequency band is same as the candidate position of the first synchronization signal block when using a second frequency band; the processor assuming the candidate position of a second synchronization signal block in the slot when using the first frequency band is different from the candidate position of the second synchronization signal block when using the second frequency band, wherein a predetermined symbol gap is secured between the candidate position of the first synchronization signal block and the candidate position of the second synchronization signal block when using the first frequency band, wherein the first frequency band has higher frequency than the second frequency band; and a receiver that receives the synchronization signal blocks for which the symbol gap is secured, wherein the processor assumes that slots including the candidate positions of synchronization signal blocks are consecutive for a predetermined number or more.

2. The terminal according to claim 1, wherein the processor assumes that slots including the candidate positions of synchronization signal blocks are consecutive for eight or more slots in a half frame.

3. The terminal according to claim 1, wherein the processor assumes that the predetermined symbol gap secured between the candidate position of the first synchronization signal block and the candidate position of the second synchronization signal block in the slot is longer when using the first frequency band than when using the second frequency band.

4. A radio base station comprising:

a processor that determines a candidate position of a first synchronization signal block in a slot when using a first frequency band is same as the candidate position of the first synchronization signal block when using a second frequency band; the processor determining the candidate position of a second synchronization signal block in the slot when using the first frequency band is different from the candidate position of the second synchronization signal block when using the second frequency band, wherein a predetermined symbol gap is secured between the candidate position of the first synchronization signal block and the candidate position of the second synchronization signal block when using the first frequency band, wherein the first frequency band has higher frequency than the second frequency band; and a transmitter that transmits the synchronization signal blocks for which the symbol gap is secured, wherein the processor determines that slots including the candidate positions of synchronization signal blocks are consecutive for a predetermined number or more.

5. A radio communication system including a terminal and a radio base station, wherein the radio base station comprises a transmitter that transmits a synchronization signal block, the terminal comprises:

a processor that assumes a candidate position of a first synchronization signal block in a slot when using a first frequency band is same as the candidate position of the first synchronization signal block when using a second frequency band; the processor assuming the candidate position of a second synchronization signal block in the slot when using the first frequency band is different from the candidate position of the second synchronization signal block when using the second frequency band, wherein a predetermined symbol gap is secured between the candidate position of the first synchronization signal block and the candidate position of the second synchronization signal block when using the first frequency band, wherein the first frequency band has higher frequency than the second frequency band;

a receiver that receives the synchronization signal blocks for which the symbol gap is secured, wherein the processor assumes that slots including the candidate positions of synchronization signal blocks are consecutive for a predetermined number or more.

6. A radio communication method of a terminal comprising:

assuming a candidate position of a first synchronization signal block in a slot when using a first frequency band is same as the candidate position of the first synchronization signal block when using a second frequency band;

assuming the candidate position of a second synchronization signal block in the slot when using the first frequency band is different from the candidate position of the second synchronization signal block when using the second frequency band, wherein a predetermined symbol gap is secured between the candidate position of the first synchronization signal block and the candidate position of the second synchronization signal block when using the first frequency band, wherein the first frequency band has higher frequency than the second frequency band; and receiving the synchronization signal blocks for which the symbol gap is secured, wherein slots including the candidate positions of synchronization signal blocks are assumed to be consecutive for a predetermined number or more.

* * * * *